United States Patent [19]

Longpré et al.

[11] Patent Number: 4,495,688

[45] Date of Patent: Jan. 29, 1985

[54] PREFABRICATED CONCRETE PANEL WITH TRUSS

[76] Inventors: François Longpré, 6200 Chemin Beaudet; Yves Longpré, Casier Postal 94, rue Léas; Pierre Longpré, 4974 Chemin Ste-Catherine, all of Rock Forest, Quebec, Canada, J0B 2J0

[21] Appl. No.: 530,105

[22] Filed: Sep. 7, 1983

[51] Int. Cl.³ .......................... B23P 19/04; E04B 1/16

[52] U.S. Cl. .......................................... 29/460; 52/334

[58] Field of Search .................. 29/460; 264/228, 275; 249/83, 91, 93; 52/577, 334, 125.5

[56] References Cited

U.S. PATENT DOCUMENTS

| | | | |
|---|---|---|---|
| 2,558,946 | 7/1951 | Fromson | 52/334 |
| 3,727,876 | 4/1973 | Keyser | 249/91 |
| 3,885,369 | 5/1975 | Ott | 52/334 |
| 4,084,780 | 4/1978 | Mess | 52/125.5 |
| 4,159,099 | 6/1979 | Maguirre | 249/93 |
| 4,228,985 | 10/1980 | Gaudelli et al. | 249/93 |
| 4,320,606 | 3/1982 | Gang Rao | 52/125.5 |

*Primary Examiner*—Howard N. Goldberg
*Assistant Examiner*—Steven E. Nichols
*Attorney, Agent, or Firm*—Schwartz, Jeffery, Schwaab, Mack, Blumenthal & Koch

[57] ABSTRACT

Method of manufacturing this panel by pouring concrete in a mold where a reinforcement has been introduced. According to the method there are first of all provided rectangular molds in which at least two of the opposite sides are flared. Concrete is thereafter poured into one of the molds while introducing the reinforcement and this operation is continued until the mold is completely filled. On the other hand, there are provided steel trusses having seating pads at both ends thereof, each truss being formed of a base and a head connected together by a system of metallic rods mounted in zigzag. Then, the two trusses are spacedly mounted parallel to one another as well as with the two flared sides of the mold, above the surface of the concrete which has been freshly poured in the mold and the head of the truss is caused to penetrate therein by means of a U-shaped winch mechanism until the seating pads of the trusses come flush with the surface of the concrete. The concrete in which the head of the truss is embedded is thereafter allowed to harden. The panel of reinforced concrete is then unmolded preferably by holding it by means of the trusses and it is then rotated 180° along its longitudinal axis so as to enable it to be ready to be disposed on a frame work to constitute a flooring panel. This method enables a floor to be mounted very rapidly and to provide an economy of concrete.

13 Claims, 10 Drawing Figures

Fig. 1
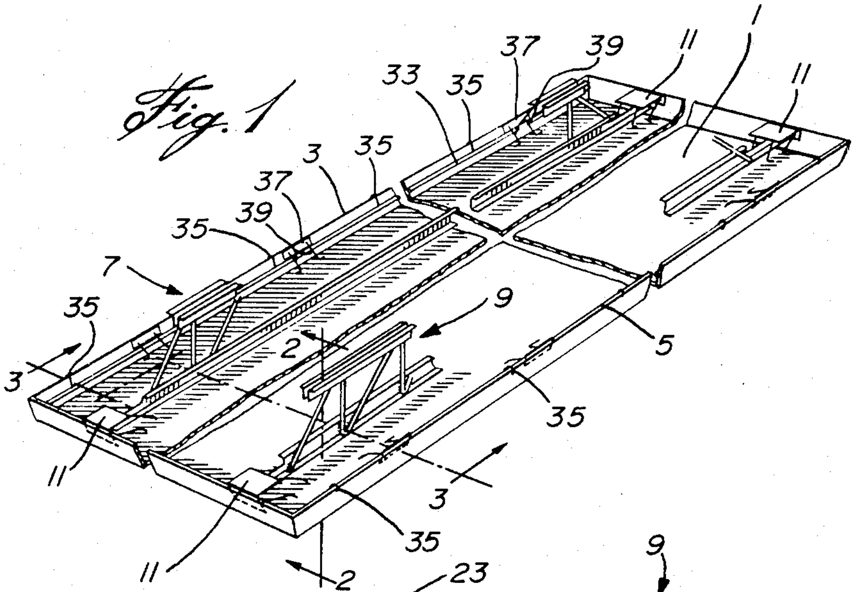
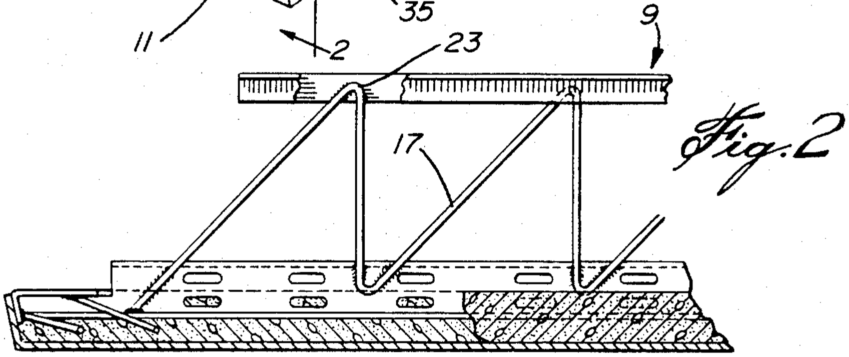
Fig. 2
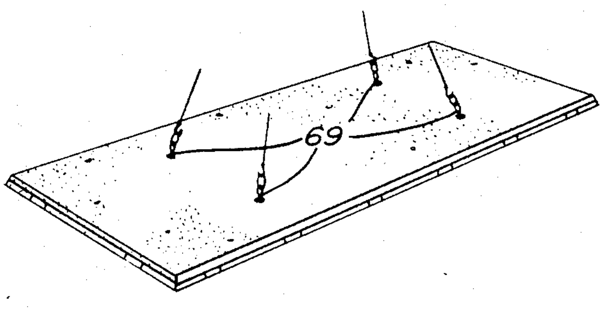
Fig. 9
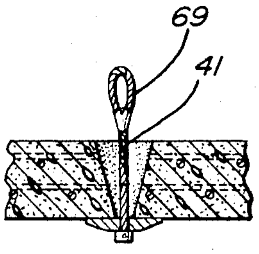
Fig. 8

PREFABRICATED CONCRETE PANEL WITH TRUSS

BACKGROUND OF INVENTION (a) Field of the Invention

The invention concerns a prefabricated concrete panel with steel trusses, and more specifically, the invention relates to a method of manufacturing a reinforced concrete flooring tile by pouring concrete in a mold where a reinforcement has been introduced.

(b) Description of Prior Art

It is known that any construction of some importance implies the pouring of concrete on location. This is also true of the construction of flooring. Now this operation is quite complicated, expensive and means long working hours. To our knowledge, presently there is no practical way to manufacture prefabricated reinforced concrete flooring tiles. Two U.S. Pat. Nos. 4,185,423 and 3,990,193 use a steel truss in combination with a concrete slab. However, these slabs are mainly used for the ceilings and the walls and the pouring of the concrete is carried out on location. There is therefore a need for a method which is readily available for the manufacturing of reinforced concrete flooring tiles.

SUMMARY OF INVENTION

In order to improve the conventional methods of construction, we have invented a method of manufacturing reinforced concrete flooring tiles by pouring concrete in a mold where a reinforcement has been introduced. This method is characterized by the fact that there are provided rectangular molds in which at least two opposite sides are flared, concrete is poured into one of the molds while introducing therein a reinforcement, and this operation is continued until the mold is completely filled with concrete. On the other hand, there are provided at least two steel trusses having seating pads at both ends, each truss being formed of a base and a head, connected together by means of metallic rods which are mounted in zigzag. Then, the two trusses are spacedly mounted parallel to one another, as well as with the two tapered sides above the surface of the concrete which has been freshly poured into the mold and the head is allowed to penetrate therein until the seating pads of the trusses are flush with the surface of the concrete. The concrete in which the head of the trusses is embedded is then allowed to harden. Thereafter, the reinforced concrete tile is withdrawn from the mold and it is rotated 180° along its longitudinal axis so as to be ready to be disposed on a framework to constitute a flooring tile.

According to an embodiment of the invention, before pouring the concrete, a rod is placed substantially midway against each of the flared sides of the mold, said rod having fixed thereon a series of angle irons which are hooked onto the edges of the sides. This enables to obtain a channel in the inclined face of the flooring tile. This channel can also be produced mechanically by means of a grinding wheel.

According to another preferred embodiment of the invention, once the concrete has been poured, steel plates which are narrower than the width of the flared sides are inserted into the concrete by causing them to penetrate therein while sliding them along the sides until their upper edge is flush with the edge of the side. The plate is provided with an anchor rod enabling it to be retained in the concrete. On the other hand, the plates rest against the inner faces of the sides. Once the tiles have been withdrawned from the molds, and after having been aligned side by side, V-shaped channel is formed in which the recesses are formed and the steel plates will be found to face one another. To connect the two tiles, these steel plates are welded together and the V-shaped channel is filled with concrete, the recesses facilitating the hardening of the concrete to form a surface which is uniform between the two tiles.

According to another preferred embodiment of the invention, tapered cylindrical members are placed in the mold, after pouring the concrete, so as to obtain evenly distributed holes in the flooring tile, these holes enabling to slide anchors therein to move the tile around.

According to another preferred embodiment of the invention, the pair of trusses which are parallel to one another are connected together by means of steel counter-braces which are welded on the bases and the heads of said trusses. This operation is carried out before pouring concrete.

According to another preferred embodiment of the invention, opposite each counter-brace, there is provided an anchor rod which is welded at the base of the truss and extends diagonally outwardly of the trusses to penetrate inside the concrete, its lower end being curved for a better anchor.

According to another preferred embodiment of the invention, between the counter-braces, there is at least one inverted V-shaped anchor element whose apex is welded at the base of the truss, and whose legs curved at their lower ends extend on both side of a truss and are embedded into the concrete to give more rigidity to the trusses.

According to another preferred embodiment of the invention, the withdrawing of the reinforced concrete tile from the mold is carried out by holding the tile of hardened concrete by the trusses, such as by using a winch and steel cables.

According to another preferred embodiment of the invention, the tile is placed in a device provided with rotary frames, and after that, the tile is rotated 180° so that the trusses now appear below the tile. Preferably, the rotary frame device comprises a fixed vertical body on which a first U-shaped rotary frame is mounted to pivot centrally on the fixed vertical body, clamps being provided on this first frame opposite each of the seating pads of the truss to fixedly mount one end of the tile in the first frame. The device also comprises a vertical body mounted on a slide, which is longitudinally movable and on which there is mounted a second U-shaped rotary frame centrally pivoted on the vertical body mounted on a slide, clamps being provided on this second frame to fixedly mount the other end of the tile and a lever to move the vertical body mounted on a slide forward or backward depending on the length of the tile.

Preferably, during the rotation of the tile, anchor rings are mounted in the tapered holes and the tile is thereafter held by the anchor rings by means of a winch, which enables to carry the tile on any carrying means, such a truck.

A method of construction of floor using prefabricated concrete tiles according to the present invention, is characterized by the fact that the tiles obtained according to the invention are placed side by side thereby creating a V-shaped channel between the tiles. The facing steel plates are then welded together and the channel is filled with concrete, including the recesses provided in the inclined faces of the tiles.

Other details and characteristics of the present invention will appear from the description which follows of a preferred embodiment of the invention giving only by way of illustration without limiting the scope of the invention and of the appended claims.

In the annexed drawings:

FIG. 1 is a perspective view of the mold, also showing the trusses, the side rods as well as the plates;

FIG. 2 is a section taken along line 2—2 of FIG. 1.

FIG. 8 is a partial cross-section view showing the tapered holes provided in the tile in which are disposed anchor rings;

FIG. 9 is a view of the prefabricated tile taken from above as it is being carried toward a carrying means.

Figure 3:
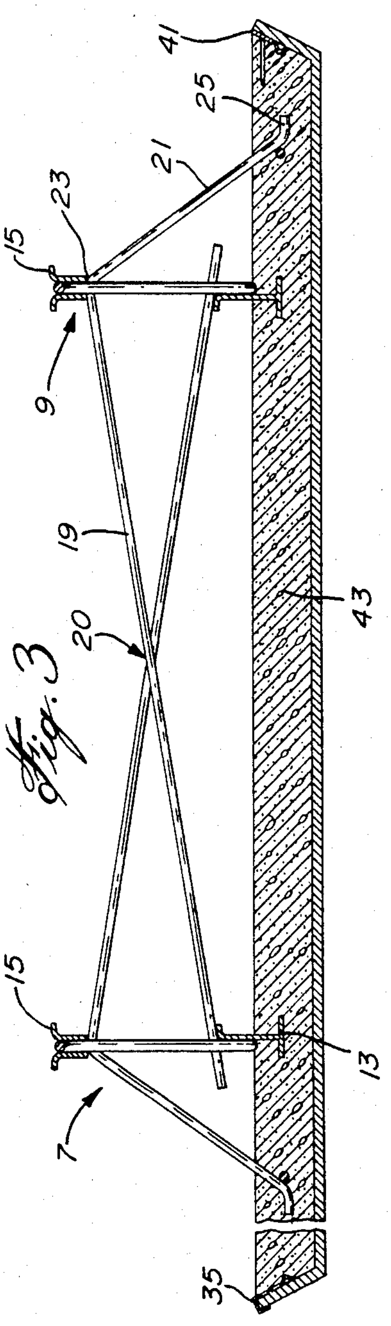
FIG. 3 is a section taken along line 3—3 of FIG. 1.

With reference to the drawings, it will be seen that there must first be provided a mold 1 of rectangular shape in which the lateral sides 3 and 5 are flared. Preferably, the angle which is used to produce the widening of the sides of the mold can vary to some extent depending on the wish of the manufacturer. However, it has been found that it is possible to obtain excellent results by using an angle of 60°. Before pouring the concrete, two steel trusses 7 and 9 are provided, each having seating pads 11 at both ends. It will be noted on the other hand, that each of the truss is formed of a conventional base 13 and a head 15. The base 13 and the head 15 are connected together by means of a system of metallic rods 17 arranged in zigzag, all in a conventional manner. In order to have an assembly which causes no problem when pouring concrete and to make sure that trusses will be well embedded in the concrete and will not move during the pouring operation, when the concrete hardens and when the tiles will be moved once the operation is terminated and during the construction of a floor, the pair of tiles 7, 9 is connected together in a parallel fashion by means of steel counter-braces 19. It will be noted that these counter-braces 19 are welded on the heads 15 as well on the bases 13 of the trusses as well as at the center 20. Reference is particularly made to FIG. 3 of the drawings. Each counter-brace extends as an anchor rod 21 at the base of the truss at 23. It will be noted that this extension of the anchor rod 21 extends diagonally outwardly of the trusses to penetrate inside the concrete, its lower end being curved at 25 for a better anchoring.

Figure 4:
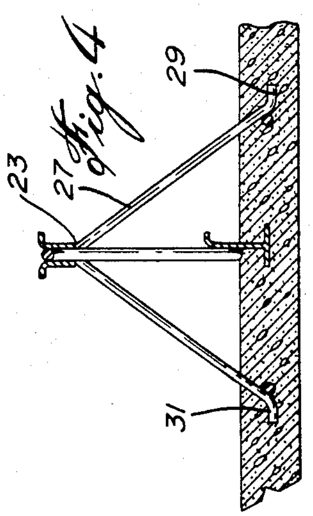
FIG. 4 is a view showing the inverted V-shaped elements for holding the trusses.

It is obvious, that for economical reason, there should not be used too many counter-braces 19 which are disposed here and there along the trusses 7, 9 depending on the length of the latter. However, in order to make sure of a better rigidity of the assembly, between the counter-braces 19, there is provided at least one anchor piece 27 shaped as an inverted V whose apex is welded at 23 at the base of the truss and whose legs curved at their lower ends 29 and 31 extend on both side of a truss and are embedded into the concrete to give more rigidity to the truss, such as better illustrated in FIG. 4 of the drawing.

Before pouring concrete, there are provided two rods 33 whose length corresponds to the length of the sides 3, 5 and to which are fixed a series of angle irons 35. The rod 33 is then hooked on the upper edge of one of the sides 3, 5 by means of its angle irons 35 in such a manner that the rod rests substantially at mid-height on a flared side of the mold 1. In this manner, when concrete is poured, there is obtained a recess in the inclined face of the flooring tile.

The following operation consists in pouring concrete in the mold in a conventional manner while introducing therein a reinforcement which is also conventional. The operation is continued until the mold is completely filled with concrete.

Figure 10:
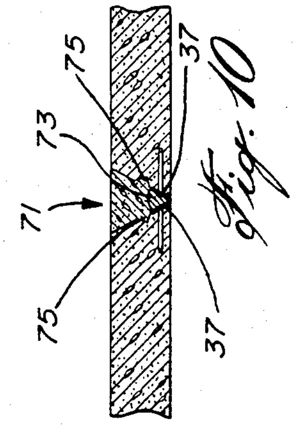

Then, the two trusses 7, 9 connected together by means of counter-braces 19 and reinforcing members 21 and 27, so as to keep them parellel to one another, as well as with the two flared sides 3, 5 of the mold 1, are placed above the surface of the concrete which has been freshly poured into the mold and thereafter, the head of the truss is allowed to penetrate into the freshly poured concrete by means of two U-shaped winch mechanisms not illustrated until the seating pads 11 of the trusses are flush with the surface of the concrete. The concrete in which the head of the trusses is embedded is then allowed to harden. Once the concrete has been poured, there are provided steel plates 35, which are obviously narrower than the width of the sides 3, 5, said plates being provided with anchor rods 39, enabling the plate to be retained in the concrete. These steel plates are inserted into the concrete by allowing them to penetrate therein while sliding along the sides until their upper edges 41 are flush with the upper edge of the side 3 or 5. It will be seen that, in this manner, the plates come to rest against the internal face of the side. When the tile will be withdrawn from the mold, the side will be provided with a steel plate 37 as will be seen in FIG. 10.

Finally, tapered cylindrical pieces not illustrated, are placed on the mold, after pouring the concrete, so as to obtain holes 41 which are evenly distributed in the flooring tile.

As will be seen later, these holes enable to slide anchors therein to move the tile around.

The withdrawing of the reinforced concrete tile from the mold is carried out by grasping the hardened concrete tile by means of the trusses. Normally, this operation is carried out by means of winches which are allowed to move in known manner along the ceiling of a plant. Once the tile 43 has been grasped by the trusses, it is placed in a rotary frame device and once this operation is over, the tile is rotated 180° in order that the trusses appear underneath the tile. For a more specific description of the rotary frame device reference will be particularly made to FIGS. 5, 6 and 7.

The rotary frame device comprises a fixed vertical stand 45 on which there is a mounted U-shaped rotary frame 47 which is centrally pivoted at 49, in known manner on the fixed vertical stand 45. On the other hand, there are provided clamps 51 and 53 on the frame 47, opposite each of the seating pads 11 at one end of the trusses 7, 9. These clamps are intended to fixedly mount one end of the tile 43 in the frame 47. On the other hand, the device comprises a vertical stand 55 mounted on a slide 57, which is longitudinally movable, as will be seen in FIG. 5, and on which is mounted a U-shaped rotary frame 59 which is centrally pivoted at 61 on the vertical stand 55. Clamps 63, 65 are provided on this frame 55 so as to fixedly mount the other end of the tile 43 in the frame 55. Finally, the rotary frame device also comprises a lever 67 which is operated in known manner to cause forward or rearward movement of the vertical stand 55, which is mounted on a slide 57, depending on the length of the tile 43.

Figures 5, 6, 7:
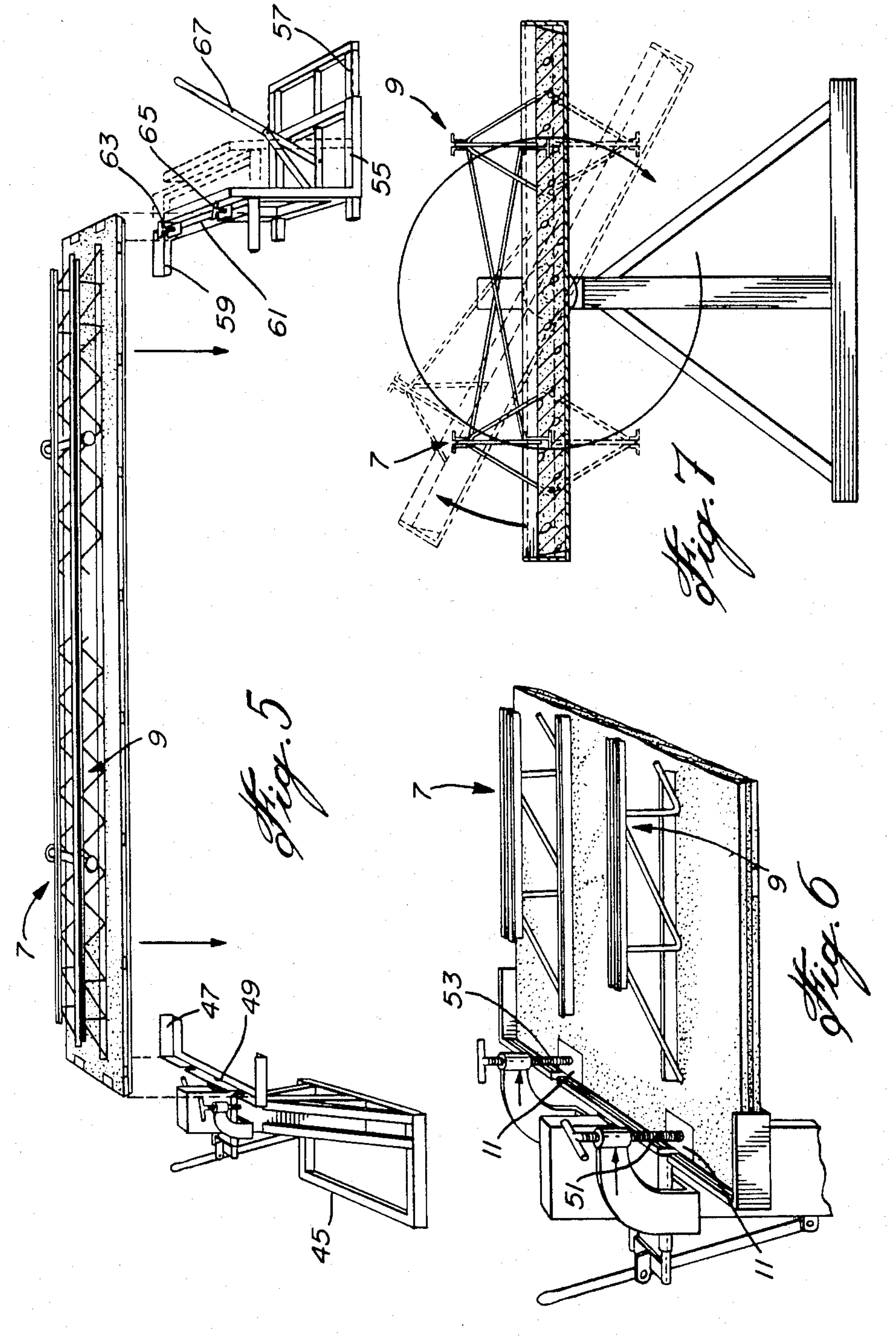
FIG. 5 is a perspective view illustrating the operation which enables to place the hardened concrete prefabricated tile on a rotary frame device.
FIG. 6 is a view of one of the ends of the rotary frame device illustrating the mounting of one of the ends of the tile in the frame.
FIG. 7 is a view showing the rotation of the prefabricated concrete tile.

To cause a 180° rotation of the tile 43, it is merely sufficient to carry out a manual operation such as seen on FIG. 7 of the drawings. After the tile has been rotated 180°, anchor rings 69 are mounted in the holes 41 and the tile is then grasped by the anchoring by means of a winch. This operation enables to carry the tile on a carrying means, such as a truck or any other piece of equipment.

It will be obvious that the method of construction of floors utilizing the tiles according to the invention is greatly facilitated. For this purpose it is merely necessary to dispose tiles obtained according to the method of the invention side by side which will produce a V-shaped channel 71 between the tiles. Reference will particularly be made to FIG. 10 of the drawings. The steel plates 37 which are facing one another are welded together at 73 and the channel 71 is thereafter filled with concrete, including the recesses 75 provided in the inclined faces of the tiles.

This method of manufacturing largely improves the construction of floors of buildings of some importance. There is a substantial economy of time, operation and materials.

We claim:

1. Method of manufacturing reinforced concrete flooring tile by pouring concrete in a mold containing a reinforcement, which comprises:

providing rectangular molds in which at least two opposite sides are flaring up;

pouring concrete in one of said mold while introducing a reinforcement therein, and continuing said pouring until the mold is completely filled with concrete;

separately preparing at least two steel trusses provided with seating pads at both ends thereof, each truss being formed of a base and a rod head, connected together by means of metallic rods arranged in zigzag;

arranging said two trusses spacedly parallel to one another and with the two flaring up sides, disposing said parallel trusses above the surface of freshly poured concrete in said mold, allowing the head to penetrate therein until the seating pads of said trusses are flush with the surface of the concrete, and allowing the concrete in which the head of the trusses are embedded to harden;

removing the reinforced concrete tile from the mold; and rotating said tile 180° along its longitudinal axis so as to enable it to be readily available for placement on a framework to constitute a flooring tile.

2. Method according to claim 1, in which before pouring the concrete, a rod which is provided with a series of angle irons and anchoring means is mounted to rest at mid-height on each of the flaring up sides of the mold, which enables to obtain a recess in inclined face of the flooring tile.

3. Method according to claim 2, in which once the concrete has been poured, steel plates which are narrower than the sides of said mold are inserted in the concrete by causing them to slide along the sides of said mold until the upper edge of said plates are flush with the edges of said side said plate being provided with at least one anchor rod enabling it to be held in the concrete, said plates resting on the internal faces of said sides.

4. Method according to claim 2, which comprises placing tapered cylindrical members in said mold before pouring said concrete so as to obtain evenly distributed holes in said flooring tiles, said holes enabling to slide therein anchoring means to move the tile around.

5. Method according to claim 4, which comprises connecting the pair of trusses mounted in parallel fashion by means of steel counter-braces which are welded on the rod heads and the heads of said trusses.

6. Method according to claim 5, which comprises providing an anchor rod welded at the head of said truss opposite each counter-brace, said anchor rod extending diagonally outwardly of of said trusses to penetrate in the concrete, the lower end of said anchor rod being curved to give a better anchor in said concrete.

7. Method according to claim 6, which comprises providing at least one inverted V-shaped anchoring member between said counter-braces, the apex of said anchoring member being welded at the base of said truss, the legs being curved at their lower end and extending on each sides of a truss so as to anchor in concrete to give better rigidity to said trusses.

8. Method according to claim 7, which comprises withdrawing the reinforced concrete tile from the mold by grasping the hardened concrete tile by means of the truss embedded in concrete.

9. Method according to claim 1, which comprises placing the tile in a rotary frame device rotating said tile 180° so as to dispose the trusses underneath said tile.

10. Method according to claim 9, wherein said rotary frame device comprises a fixed vertical stand on which a first U-shaped rotary frame is mounted, said first rotary frame being centrally pivoted on said fixed vertical stand, clamps being provided on said first frame opposite each seating pads of the truss at one end thereof to fixedly mount said one end of said tile in said first frame, a vertical stand mounted on a slide, which is longitudinally movable, a second U-shaped rotary frame mounted on said vertical stand mounted on a slide, said second rotary frame being centrally pivoted on said vertical stand mounted on a slide, clamps being provided on said second frame to fixedly mount the other end of said tile in said second frame, and a lever to cause the vertical stand mounted on a slide to move frontward or rearward depending on the length of the tile.

11. Method according to claim 9, wherein after rotation of said tile, anchoring rings are mounted in said holes, and grasping said tile at said anchoring rings by means of a winch, which enables to carry said tile on a carrying means.

12. Method of construction of a floor with prefabricated concrete tiles, which comprises a disposing side by side tiles obtained by the method according to claim 3, to provide a V-shaped channel between said tile, said steel plates facing one another welding said steel together, and filling said channel with concrete including said recesses provided in said inclined faces of said tiles.

13. Method according to claim 1, which comprises causing the head of the truss to penetrate in said concrete by means of two U-shaped winch mechanisms.

* * * * *